United States Patent
Alaettinoglu et al.

(10) Patent No.: US 12,517,979 B2
(45) Date of Patent: Jan. 6, 2026

(54) SYSTEMS AND METHODS TO SPEED UP DATA STREAM PROCESSING

(71) Applicant: Ciena Corporation, Hanover, MD (US)

(72) Inventors: Cengiz Alaettinoglu, Sherman Oaks, CA (US); Prasad Chavan, Pune (IN); Roopesh Palasdeokar, Pune (IN); Vaibhav Lohani, Pune (IN); Mohak Gadge, Rajura (IN)

(73) Assignee: Ciena Corporation, Hanover, MD (US)

( * ) Notice: Subject to any disclaimer, the term of this patent is extended or adjusted under 35 U.S.C. 154(b) by 470 days.

(21) Appl. No.: 18/097,655

(22) Filed: Jan. 17, 2023

(65) Prior Publication Data

US 2024/0169026 A1    May 23, 2024

(30) Foreign Application Priority Data

Nov. 22, 2022  (IN) .............................. 202211066900

(51) Int. Cl.
*G06F 17/40* (2006.01)

(52) U.S. Cl.
CPC .................................. *G06F 17/40* (2013.01)

(58) Field of Classification Search
CPC .......... G06F 17/40; G06F 18/10; G06F 18/20; G06N 20/00; G06N 3/126; H04L 41/0816; H04L 41/0896; H04L 41/12; H04L 41/14; H04L 41/142; H04L 41/147; H04L 41/149; H04L 41/16; H04L 43/04; H04L 43/062; H04L 43/0852; H04L 43/0876; H04L 43/0882; H04L 43/0888; H04L 43/12; H04L 45/02; H04L 45/123; H04L 45/124; H04L 45/22; H04L 45/38; H04L 45/48; H04L 45/70; H04L 45/74; H04L 47/83; H04L 63/1425; H04L 67/10; H04W 24/00; H04W 24/02; H04W 24/04; H04W 24/08; H04W 40/12

See application file for complete search history.

(56) References Cited

U.S. PATENT DOCUMENTS

| | | | |
|---|---|---|---|
| 7,120,792 B1 | 10/2006 | Jacobson et al. | |
| 7,197,573 B1 | 3/2007 | Jacobson et al. | |
| 7,539,191 B1 | 5/2009 | Jacobson et al. | |
| 8,135,834 B1 | 3/2012 | Jacobson et al. | |
| 8,274,901 B1 | 9/2012 | Casner et al. | |
| 8,422,502 B1 | 4/2013 | Alaettinoglu et al. | |
| 8,824,331 B1 | 9/2014 | Alaettinoglu et al. | |
| 8,937,946 B1 | 1/2015 | Kanna et al. | |
| 11,057,278 B1 | 7/2021 | Côté et al. | |
| 2010/0118885 A1* | 5/2010 | Congdon | H04L 49/254 370/419 |

(Continued)

*Primary Examiner* — Christopher Biagini
(74) *Attorney, Agent, or Firm* — Baratta Law PLLC; Lawrence A. Baratta, Jr.

(57) ABSTRACT

Systems and methods include receiving an input including a plurality of data points; processing the input at times where data points are received; preprocessing the input at times where some data points are lagging, the preprocessing includes a computation based on one or more predicted input values for lagging data points and storing one or more predicted output values in a cache based on the one or more predicted input values; and responsive to receiving the lagging data points, obtaining an associated output value from the cache.

20 Claims, 7 Drawing Sheets

(56) References Cited

U.S. PATENT DOCUMENTS

| | | | |
|---|---|---|---|
| 2014/0079063 A1* | 3/2014 | Edsall | H04L 49/9057 370/392 |
| 2015/0138219 A1* | 5/2015 | Zacharias | H04L 67/10 345/581 |
| 2015/0271034 A1 | 9/2015 | Kanna et al. | |
| 2016/0057049 A1 | 2/2016 | Jacobson et al. | |
| 2021/0099378 A1 | 4/2021 | Alaettinoglu et al. | |
| 2022/0086078 A1 | 3/2022 | Sivabalan et al. | |

* cited by examiner

SYSTEMS AND METHODS TO SPEED UP DATA STREAM PROCESSING

FIELD OF THE DISCLOSURE

The present disclosure generally relates to networking. More particularly, the present disclosure relates to systems and methods for speeding up data stream processing.

BACKGROUND OF THE DISCLOSURE

Various systems which continuously process data for multiple data streams require timely inputs to consistently produce time sensitive outputs. Input streams can have constant lag, which can introduce problems to the time sensitive processing. Various systems can have one or more lagged streams which delay the processing, and in many cases, the processing must be completed in a set amount of time. If the delay in output availability from current time exceeds processing granularity, the delay will keep adding up and growing with each new input data point. The present disclosure provides systems and methods to improve the processing speed of such a system, by introducing parallelizing the processing of data points of different times, and leveraging patterns in data streams to predict various outputs for the system to be prepared for any of the predicted inputs.

BRIEF SUMMARY OF THE DISCLOSURE

The present disclosure relates to systems and methods for speeding up data stream processing. Embodiments focus on systems which continuously process data from a plurality of data streams to produce periodic outputs based on inputs from the data streams. The processing can be time sensitive, meaning that data points for the same time or grouped in the same time interval must be used from all data streams (input streams) to generate the output for that time (i.e., the periodic output). Such input streams can have a constant lag from a current time, and a known predictable pattern (sinusoidal, cosinusoidal, etc.). The present system has the capability to store the data points from different streams to process or use them later in order to optimize the processing time, such as when a lag is encountered.

In various embodiments, the present disclosure includes a method with steps, a system including a processor configured to implement the steps, and a non-transitory computer-readable medium with instructions that, when executed, cause a processing device to perform the steps. The steps include receiving an input including a plurality of data points. Processing the inputs at times where data points are received. Preprocessing the input at times where some data points are lagging, the preprocessing includes a computation based on one or more predicted input values for the lagging data points and storing one or more predicted output values in a cache based on the one or more predicted input values. Responsive to receiving the lagging data points, obtaining an associated output value from the cache.

The steps can further include finding a predicted input value that is close to a corresponding received data point. Responsive to any of the received lagging data points not being close to the predicted input values, processing the any of the received lagging data points to obtain actual output values. Responsive to a predicted input value being a partial match to a received lagging data point, processing a portion of the received lagging data point that is nota match to the predicted input value. The preprocessing of lagging data points is done in parallel with the processing of received data points. The one or more predicted input values are chosen based on a pattern. Responsive to all lagging data points being received, the steps further include reevaluating the predicted output values, wherein a final output function contains no predicted output values.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figures 1, 2:
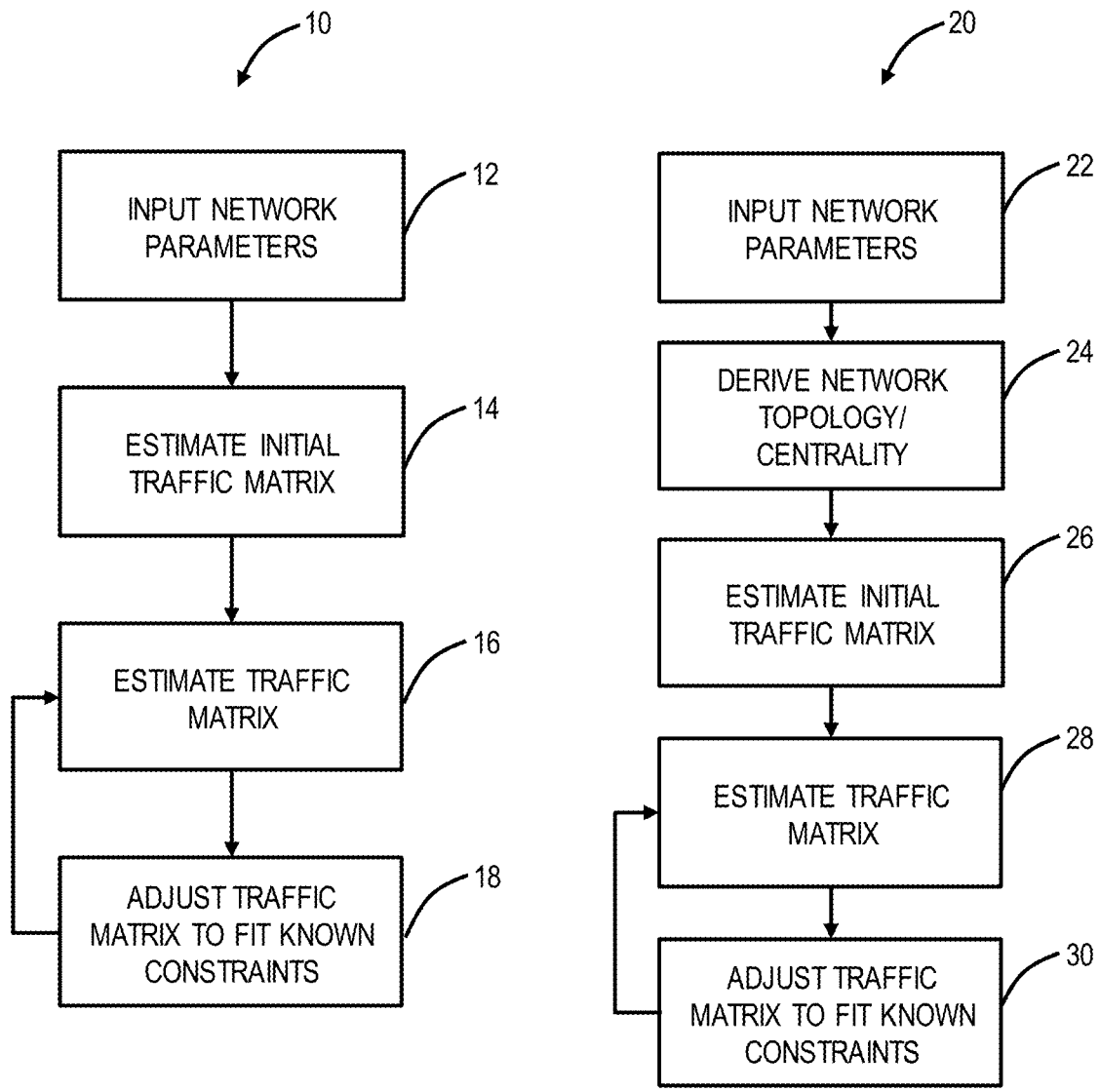
FIG. 1 is a flowchart of a general process for an iterative estimation of a traffic matrix, based on the conventional approach.
FIG. 2 is a flowchart of a process that uses topology for an iterative estimation of a traffic matrix.

Again, the present disclosure relates to systems and methods for speeding up data stream processing, where various embodiments focus on systems which continuously process data from a plurality of data streams to produce periodic outputs based on inputs from the data streams. The processing can be time sensitive, meaning that data points for the same time must be used from all data streams (input streams) to generate the output for that time (i.e., the periodic output). Such input streams can have a constant lag from a current time, and a known predictable pattern (sinusoidal, cosinusoidal, etc.). The present system has the capability to store the data points from different streams to process or use them later in order to optimize the processing time, such as when a lag is encountered. More particularly, the present invention distributes the processing stream by data points of different times. Note that this is different than splitting the data stream itself, where each data point's data is divided into parallel processing units. The lag time is utilized to pre-compute and cache the output for a previous data point, which is expected to match with the actual data that will come on the lagging stream. Due to caching, processing time will be reduced for the processing of each data point, even while processing the full load. Since the parallel processing units (process or threads) for each data point are short lived, there is not significant increase in the resource requirement of the system.

Additionally, the present disclosure relates to systems and methods for estimating a traffic matrix of a communication network using network topology features. The approach described herein significantly improves the performance of traffic matrix estimator. The proposed approach incorporates network graph statistics into the traffic matrix estimation, i.e., network topology. Advantageously, this approach was shown to significantly fast and accurate, delivering the traffic matrix in under a few seconds. Another major advantage of this approach traffic matrix inference scales to handle networks larger than any previously attempted using alternative methods. Since the initial estimation is computed with realistic assumption (fair usage of link bandwidth), it is expected that initial point is very close to the real flow counts. By doing so, the search space for finding the optimal solution is reduced significantly. This allows all recursive methods converge to the optimal solution very fast. Furthermore, this router-to-router traffic matrix may be used to directly derive an even more accurate Point of Presence (PoP) to PoP traffic matrix, and easily extending to incorporate more detailed measurements where available.

If direct measurements are not available, link count measurements (aggregate of multiple flows) and routing table information are usually available. If direct measurements are available, due to the heterogenous nature of IP networks it is likely that not all OD flows are measured. As is shown herein, finding the entire traffic matrix in either case can be done by combining partial direct measurements and utilizing the available link counts and routing information.

As described herein, the traffic matrix includes bandwidth between origin and destination. Bandwidth is an amount of traffic on a given link over a given time and can be expressed as megabits/second, gigabits/second, etc. For a given link, routers are able to keep logs of link count measurements, e.g., the amount of data seen on that link over some period of time. The present disclosure contemplates various definitions for bandwidth and any such definition can be used to describe the entries in the traffic matrix. For example, RFC 3917, "Requirements for IP Flow Information Export (IP-FIX)," October 2004, the contents of which are incorporated by reference, describes building a statistical model of a flow that includes its du ration, volume, time, and burstiness. As such, related to bandwidth, this could describe estimating the volume of an IP flow in the period of time in-between the measurements. For example, assume there is a desire to for an estimate of the volume of a single/aggregated traffic flow between a pair of A-Z in a network, over a 15-minute interval (how many bytes of flow(s) observed in 15 minutes). Given this estimate, it is possible to estimate the aggregate IP flow rate in the 15-minute interval taking the volume and dividing it by time.

Traffic Matrix Estimation from Link Measurements and Routing Information

In an IP network, the routes can be obtained by noting that most intradomain routing protocols (e.g., Open Shortest Path First (OSPF) and Intermediate System-Intermediate System (IS-IS)) are based on a shortest path algorithm such as Dijkstra's or Bellman-Ford algorithms. Routing information can be obtained by listening to routing protocol messages (various planning tools and Network Management Systems (NMS) can do this). Link volumes in an IP network are typically available from Simple Network Management Protocol (SNMP) data or by directly querying routers. The OD traffic demands are the unknown that need to be estimate from the demands. That is, the available information includes topology (connectivity between routers), routes (computed using specific protocols), and traffic volume on each link. What is unknown is the OD traffic volume/matric. The traffic volume on each link is a raw n u mber and does not show the OD.

The instantaneous traffic matrix can be related to link measurements and the routing matrix with $$y \approx Rx \quad (1)$$

where y is the vector of measured link loads over links in the network, R is the routing matrix, and x is OD traffic matrix with one row corresponding to the demand of each OD pair. A flow in the matrix is denoted with $x_i \in x$. The routing matrix is structured in a way that the link measurements y correspond to the sum of OD flows that traverse the link. Due to packet latencies and the random nature of OD pair traffic, the equation is approximate.

If partial direct measurements are available, they are subtracted from the link measurements and their OD traffic matrix entry is no longer an unknown in (1). If multipath routing is used, the flow is assumed equally split along the multiple paths and it exists as multiple entries in (1).

It should be obvious that the instantaneous traffic matrix can be estimated with $$x \approx R^{-1} y \quad (2)$$

where $R^{-1}$ is the "inverse" of the routing matrix. Alas, the routing matrix undetermined and is typically not invertible, so this solution is not possible.

To get around the undetermined matrix problem, iterative methods are used to estimate the traffic matrix.

Iterative Traffic Matrix Estimation

This disclosure describes a new approach for traffic matrix estimation from link count measurements and routing information. The approach uses the network topology to arrive at a better traffic matrix estimate than what was possible previously. The topology of a network captures the information network planners had about expected network traffic, so this is extra information used to find a better estimate of the traffic matrix.

FIG. 1 is a flowchart of a general process 10 for an iterative estimation of a traffic matrix, based on the conventional approach. The process 10 is iterative, receiving input network parameters (step 12), taking an initial traffic matrix estimate (step 14), and then using an estimation procedure (step 16) followed by an adjustment procedure (step 18). As the process 10 goes on, it produces a sequence of the traffic matrix estimates $x_0, \ldots, x_n$, each of which is expected to be closer to the true traffic matrix x in (1). The initial traffic matrix estimates and the estimate in the iterative step may produce a traffic matrix which may not match information known about the traffic (e.g., ingress/egress aggregate counts), which is fixed by using an adjustment procedure that projects the estimate into the known constraints. The success of iterative procedures is highly dependent on the initial traffic matrix estimate.

FIG. 2 is a flowchart of a process 20 that uses topology for an iterative estimation of a traffic matrix. FIG. 2 illustrates how the present disclosure differs from known approaches. Steps 22, 26, 28, 30 of the process 20 are similar to steps 12, 14, 16, 18 of the process 10, respectively. The process 20 includes a step of deriving the network topology/centrality (step 24) before the initial traffic matrix estimation (step 26). The process 20 uses a novel and effective initialization procedure for the estimation process that produces the initial traffic matrix $x_0$. The initial traffic matrix estimation uses the knowledge of the network topology (inferred from the routing matrix) to roughly partition link counters according to what the topology implies about end-to-end traffic. The rest of the procedure can remain, so a plethora of existing methods can benefit from this approach.

The accuracy of process 20 was compared with that of other approaches the performance reduces the estimation error by 20%-30%.

Initial Traffic Matrix Estimate

A significant aspect in this is disclosure is in how the initial traffic matrix is determined. The initial matrix is determined with the use of edge betweenness centrality (EBC). Assume that from the knowledge of the routing matrix, there is a set of vertices V and the set of edges E for a topology graph. It is also possible to derive the set of shortest paths. Edge between ness centrality (EBC) for an edge $e \in E$ is defined as:

$$EBC(e) = \sum_{v_i \in V} \sum_{v_j \in V} \frac{\gamma_{v_i,v_j}(e)}{\gamma_{v_i,v_j}} \quad (3)$$

where $v_i \in V$ is a node, $\gamma_{v_i,v_j}$ is the number of shortest paths between nodes $v_i$ and $v_j$, and $\gamma_{v_i,v_j}(e)$ is the number of paths between $v_i$ and $v_j$ that pass through e.

It should be noted that value of $\gamma_{v_i,v_j}(e)$ can be integral in case that just on shortest path is used among sources and destinations, while in the general case where there are multiple shortest paths with equal cost multiple paths (ECMP) are used, it can be fractal. This value can be obtained directly from routing matrix by adding up all elements of rows corresponding to edges. As it will be explained in (6) where it is shown how routing matrix is constructed for ECMP scenarios, it would be obvious how ECMP is considered in computing $\gamma_{v_i,v_j}(e)$.

Figure 3:
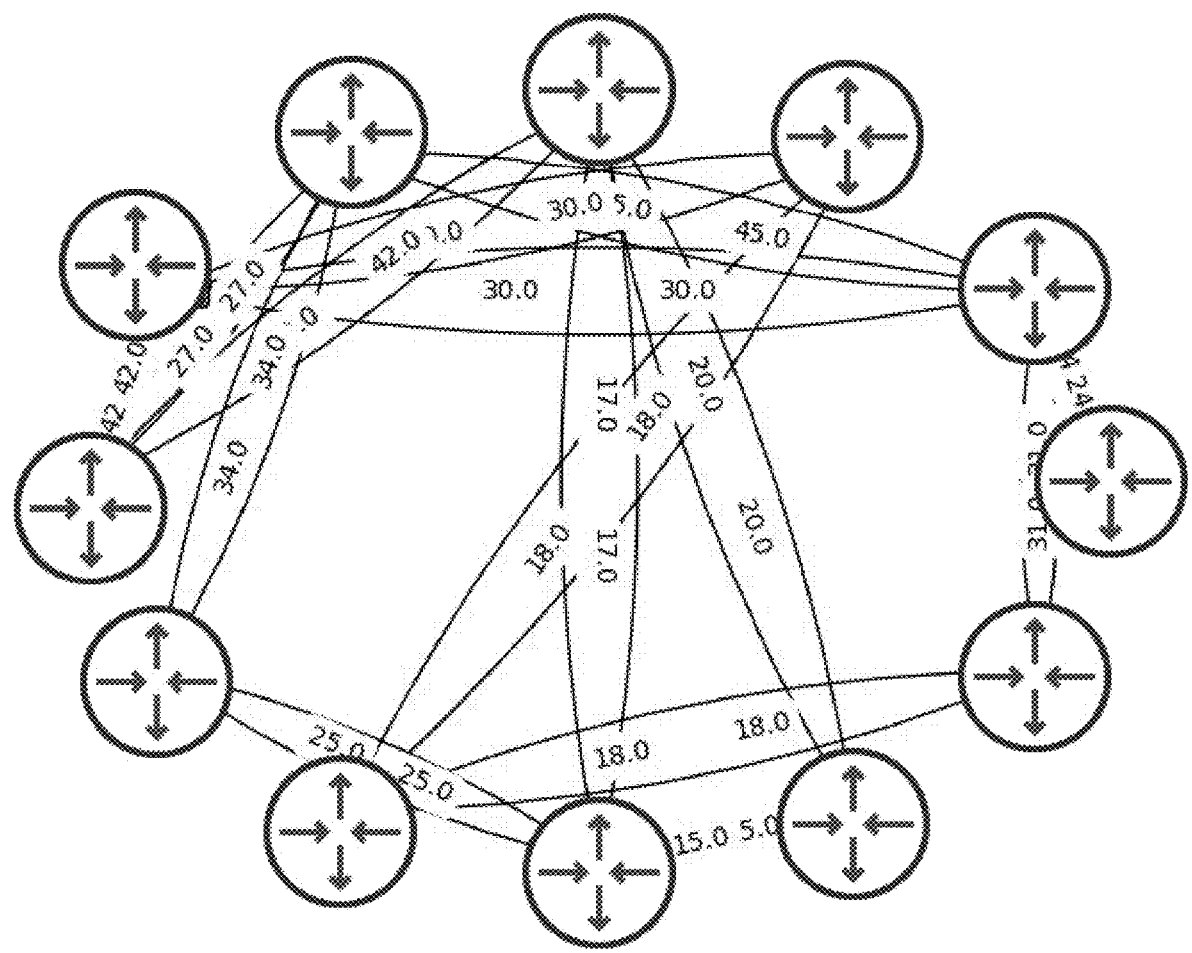
FIG. 3 is a network diagram of calculated edge between ness centrality (EBC) for edges of an example network topology.
Figure 4:
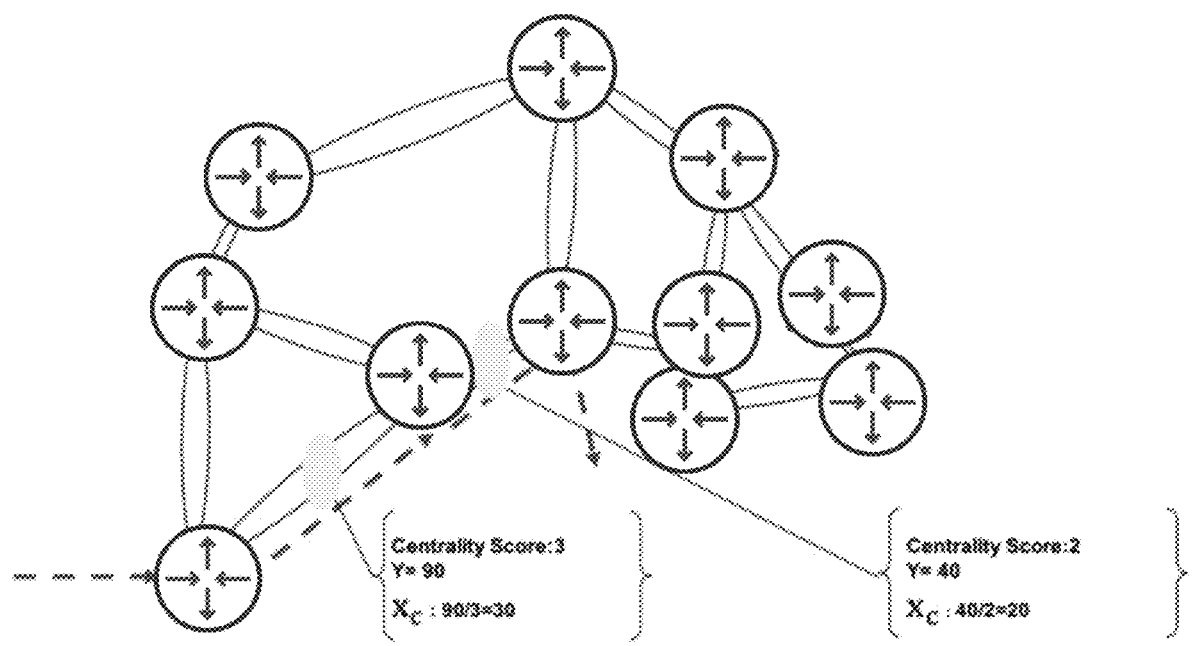
FIG. 4 is a network diagram of an example estimate based on the example network topology of FIG. 3.

FIG. 3 is a network diagram of calculated EBC for edges of an example network topology. FIG. 4 is a network diagram of an example estimate based on the example network topology of FIG. 3. Note that during network planning, the traffic is assumed to flow along shortest paths in the network, so the EBC is closely related to how much traffic network planners intended to traverse a link from various OD pairs.

To use the EBC to estimate the initial traffic matrix $x_0$, there should be a notion of fairness among flows using a link. This is like the scenario where all flows are the combination of Transmission Control Protocol (TCP) flows with any other flows which are TCP friendly. This assumption allows to estimate the fair share of aggregated traffic of a link used by all flows sharing the same link in their shortest path. It should be mention source of flows are not TCP friendly, it is the responsibility of network to enforce users to fairly utilize network bandwidth. This can be done by any variance of fair queuing. So, the OD flows can be estimated with:

$$\hat{x}_i = \underset{e \in P_i}{\mathrm{argmin}} \frac{y_e}{EBC(e)} \quad (4)$$

where $P_i$ is the path taken by the OD flow i, $y_e$ is the known link count on edge e, and this is estimating the flow as its minimum fair share among the links on its path. The initial estimate is given by concatenating the OD flows $x_0 = \{\hat{x}_1, \ldots, \hat{x}_n\}$.

The traffic estimate in (4) can be used directly as a traffic matrix estimate, or inside of an iterative estimation procedure (steps 24, 26 in FIG. 2). It should be obvious how (4) can be implemented as a software algorithm.

Iteratively Refining the Traffic Matrix

While the estimate using EBC captures what is known about the network topology, it may not fit with other information known about the traffic. There is no guarantee that the estimate obtained with (4) will satisfy (1). It is therefore recommended to use an iterative procedure to produce a traffic estimate that satisfies (1).

Without any loss of generality, focus on the case that each origin-destination pair (i, j) has only a single route between them, in which case R is a binary matrix as follows (where e denotes the index of edge):

$$R_{e,(i,j)} = \begin{cases} 1, & \text{if } e \text{ is used in a path between node } i \text{ and } j \\ 0, & \text{otherwise} \end{cases} \quad (5)$$

To support the option of multipath routing, which is known as Equal-Cost Multi-Path (ECMP) routing, when there are multiple paths with the same cost, $R_{e,(i,j)}$ in (4) is non-binary matrix, with the entry in the row corresponding to link e and the column corresponding to pair (i, j):

$$R_{e,(i,j)} = \quad (6)$$

$$\begin{cases} 1/|p|, & \text{if } e \text{ is used in one of } ECMP \text{ paths between node } i \text{ and } j \\ 0, & \text{otherwise} \end{cases}$$

Assuming a network of n nodes and r links, the traffic matrix of the network is a square matrix of dimension n×n, with diagonal elements equal to zero. The number of origin-destination (OD) pairs, denoted by c, is obtained as c=n×(n−1). By using this notation, the dimensions of y, R, and x are defined as r×1, r×c and c×1. Since there are fewer links r is than the number of OD pairs c in general networks, and R is not invertible (1) becomes and undetermined system.

One way to solve the undetermined equation is to find the matrix $\hat{x}$, which minimizes the $L_2$ norm distance to the left side of (1):

$$\hat{x} = \underset{x}{\mathrm{argmin}} \|Rx - y\| \quad (7)$$

which is one of the previous known approaches, but it ignores the knowledge of how the network is built and operates.

Instead, this approach is iterative and uses an iterative step $$\hat{x}_{i+1} = \underset{x \in \|Rx - y\| < \varepsilon}{\mathrm{argmin}} \|Rx - \hat{x}_i\| \quad (8)$$

where a quadratic programming problem is solved which pulls the estimate of the traffic matrix towards the previous estimate, while at the same time forcing to satisfy the constraint (1). An alternative way to satisfy (1) is to use a linear constraint:

$$\hat{x}_{i+1} = \underset{x \in Rx = y}{\mathrm{argmin}} \|Rx - \hat{x}_i\| \quad (9)$$

To further increase the robustness against collinearity of ordinary least squares regression, we also used regularization techniques e.g., Ridge regression (which is also referred to as L2 regularization, see, e.g., Ridge Regression, available online at ncss-wpengine.netdna-ssl.com/wp-content/themes/ncss/pdf/Procedures/NCSS/Ridge_Regression.pdf, the contents of which are incorporated by reference) and lasso regression, instead solving $$\hat{x}_{i+1} = \underset{x \in Rx=y}{\operatorname{argmin}} \|Rx - \hat{x}_i\| + \lambda \|\hat{x}_i\| \quad (10)$$

Note that the set of constraints used here is an example. Any number of other constraints can be derived and applied in equations such as (8), (9), (10), such as egress/ingress estimates, or information known from direct measurements. It is possible to implement (8), (9), (10) as a software algorithm.

Traffic Matrix Estimation Process

Figure 5:
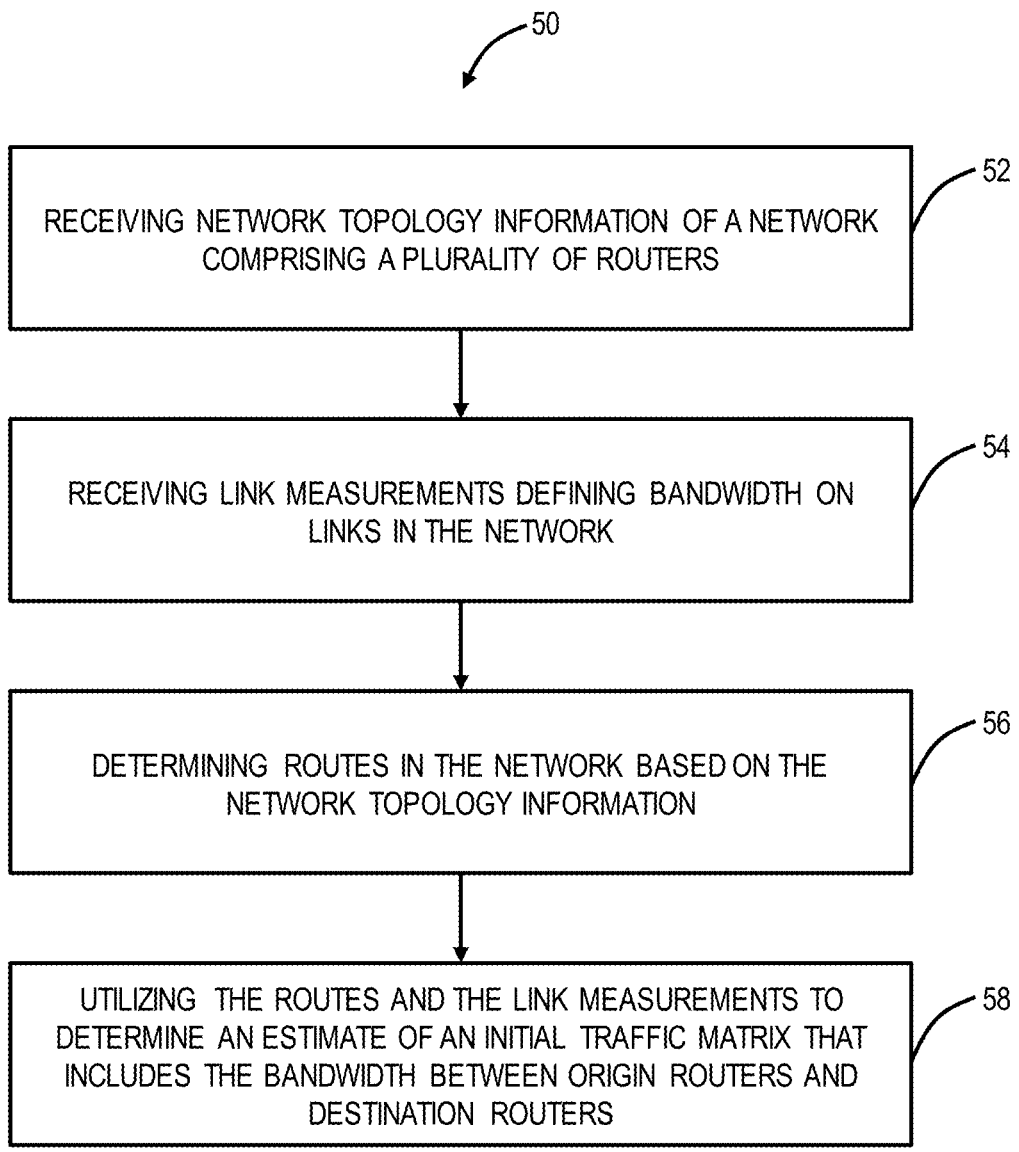
FIG. 5 is a flowchart of an iterative process to estimate a traffic matrix from link counters and routing information.

FIG. 5 is a flowchart of an iterative process 50 to estimate a traffic matrix from link counters and routing information. The process 50 contemplates implementation as a method, via circuitry or a processing device, and via instructions embodied in a computer-readable medium. The process 50 can be implemented by a network element, Network Management System (NMS), as off-box software, or the like.

The process 50 uses statistical information about the network topology graph to create an initial solution to the estimation problem. It then iteratively uses linear or quadratic programming to obtain more refined solutions of the traffic matrix that fit the known constraints from other network information.

The process 50 includes receiving network topology information of a network comprising a plurality of routers (step 52); receiving link measurements defining bandwidth on links in the network (step 54); determining routes in the network based on the network topology information (step 56); and utilizing the routes and the link measurements to determine an estimate of an initial traffic matrix that includes the bandwidth between origin routers and destination routers (step 58).

The determining routes can include determining edge between ness centrality between the plurality of routers that are edges in a network graph. The determining routes assumes traffic flows on a shortest path between the plurality of routers. The process 50 estimates a network traffic matrix using information from the network topology such as graph features and statistics of the network topology where the network topology information is determined from collected routing information, the network topology is used to extract topology graph information, and the topology graph information is used to determine an estimate of the traffic matrix.

The process 50 can further include determining the routes from listening to routing protocol messages. The process 50 can further include receiving partial direct measurements for the bandwidth and subtracting the partial direct measurements from the link measurements before determining the estimate. The process 50 can further include repeating the receiving steps, the determining step, and the utilizing step at different points in time; and averaging results to determine a traffic matrix over the point in time and the different points in time.

The process 50 can further include iteratively adjusting the initial traffic matrix to refine the estimate using other network information. The other network information can include any of link capacity, network topology, queuing discipline, and link aggregation. The iteratively adjusting can utilize an iterative statistical estimation procedure. A refinement of the method where the estimate is used in an iterative statistical estimation procedure such as maximum likelihood estimation of the traffic matrix using the expectation maximization algorithm.

Integrating topology features is adding an extra information that is always needed in under constrained problems. Additional information can also be integrated through constraints on the model parameters or some functions of them e.g., QoS parameters for different flows. Such constraints are important to avoid unconstrained values for the initial point estimator which results in more accurate final estimation.

Performance

The performance of the process 50 was compared against real traffic traces from a backbone network. The source of data is the IP-level traffic flow measurements collected form every point of presence (PoP) in a live network having 11 PoPs resulting in 121 origin-destination flows as show in FIG. 4.

The data is sampled flow data from every router over a period of six months. For validation, the RMSRE (Root Mean Square Relative Error) is used to provide an overall relative metric for the errors in the estimates.

$$RMSRE = \sqrt{\sum_{i=1}^{n} \Delta x_{rel,i}^2 \cdot 1/n} \quad (6)$$

$$\Delta x_{rel,i}^2 = x_i/t_i - 1$$

where $t_i$ is the desired value and $x_i$ is the actual value.

The results for the three approaches are presented in Table 1. The table shows the original traffic matrix, the estimated value for each OD pair and the relative error. The average error was 30% for the gravity method, 27% for the tomogravity method, and 17% for the our approach which using the Ridge regularization.

TABLE 1

| Method | RMSRE |
|---|---|
| Simple Gravity(SG) | 29.6 |
| Tomogravity | 27 |
| The process 50 | 23 |
| The process 50 + L2 regularization | 17 |

Optimizing Data Stream Processing

The present disclosure pertains to systems which continuously process data from a plurality of data streams to produce periodic outputs based on inputs from the data streams. The processing can be time sensitive, meaning that data points for the same time must be used from all data streams (input streams) to generate the output for that time (i.e., the periodic output). Such input streams can have a constant lag from a current time, and a known predictable pattern (sinusoidal, cosinusoidal, etc.). The present system has the capability to store the data points from different streams to process or use them later in order to optimize the processing time, such as when a lag is encountered. More particularly, the present invention distributes the processing stream by data points of different times. Note that this is different than splitting the data stream itself, where each data point's data is divided into parallel processing units. The lag time is utilized to pre-compute and cache the output for a previous data point, which is expected to match with the actual data that will come on the lagging stream. Due to caching, processing time will be reduced for the processing of each data point, even while processing the full load. Since the parallel processing u nits (process or threads) for each data point are short lived, there is not significant increase in the resource requirement of the system.

Various data processing systems can have parameters such as lagged streams, with a lag of L seconds from a current time. The processing time to produce the output for a time can be P seconds after data from all streams is available. Processing granularity can be G seconds, where a data point is available, and an output is expected after every G seconds. The data streams can include the various traffic flows disclosed herein, while data structures can be contemplated as the traffic matrices similarly disclosed herein. The time at which an output for a time t is available would be t+L+P seconds. If the delay in output availability from current time (L+P) exceeds processing granularity G, the delay will keep adding up and growing with each new input data point.

The present disclosure improves the processing speed of such a system, by introducing optimizations, such as parallelizing the processing of data points of different times, and leveraging the delay in stream combined with the fact that lagged streams have a set pattern. Once the processing for different times is parallelized, each parallel processing sub-unit (thread or forked process) stays idle for the lag period of other streams, L. This idle time can then be utilized to pre-compute the output using the latest data from one or more non-lagging streams, and most probable data points from past data of lagging streams. Since the lagging data streams follow a predictable pattern, a data point from a past input with very high probability of matching with the actual data can be found. This output is then cached, so that when actual data for the current time is available, it is matched against the past data point used, to check for cache hit, thus reducing or eliminating the time needed to process the lagged data.

There can be different strategies to select a data point from the past in the lagging stream. For example, in the case of a sinusoidal lagged input, selecting the previous point before the wave pattern repeated can be done (e.g., to process the data at a crest, use the previous crest in the graph). Similarly, selecting the immediate previous data points received can also be effective. Since the sine pattern changes slowly over time, the data at time t is likely to be very similar to immediate previous time t–G, where G is granularity of input. These strategies can be changed overtime, by looking at the cache hit rate as a cost function to be maximized. There can be multiple different strategies for different characteristics of lagged input patterns as well.

It shall be noted that a data point on any stream, in most cases, will refer to an average of huge amount of data. Hence, the match between the past data point used and current data point, might also be partial. For example, 60% of the data matches with the past data point used. This also gives savings in terms of computation time, as only 40% of the data needs to be processed by the system at that time.

Figure 6:
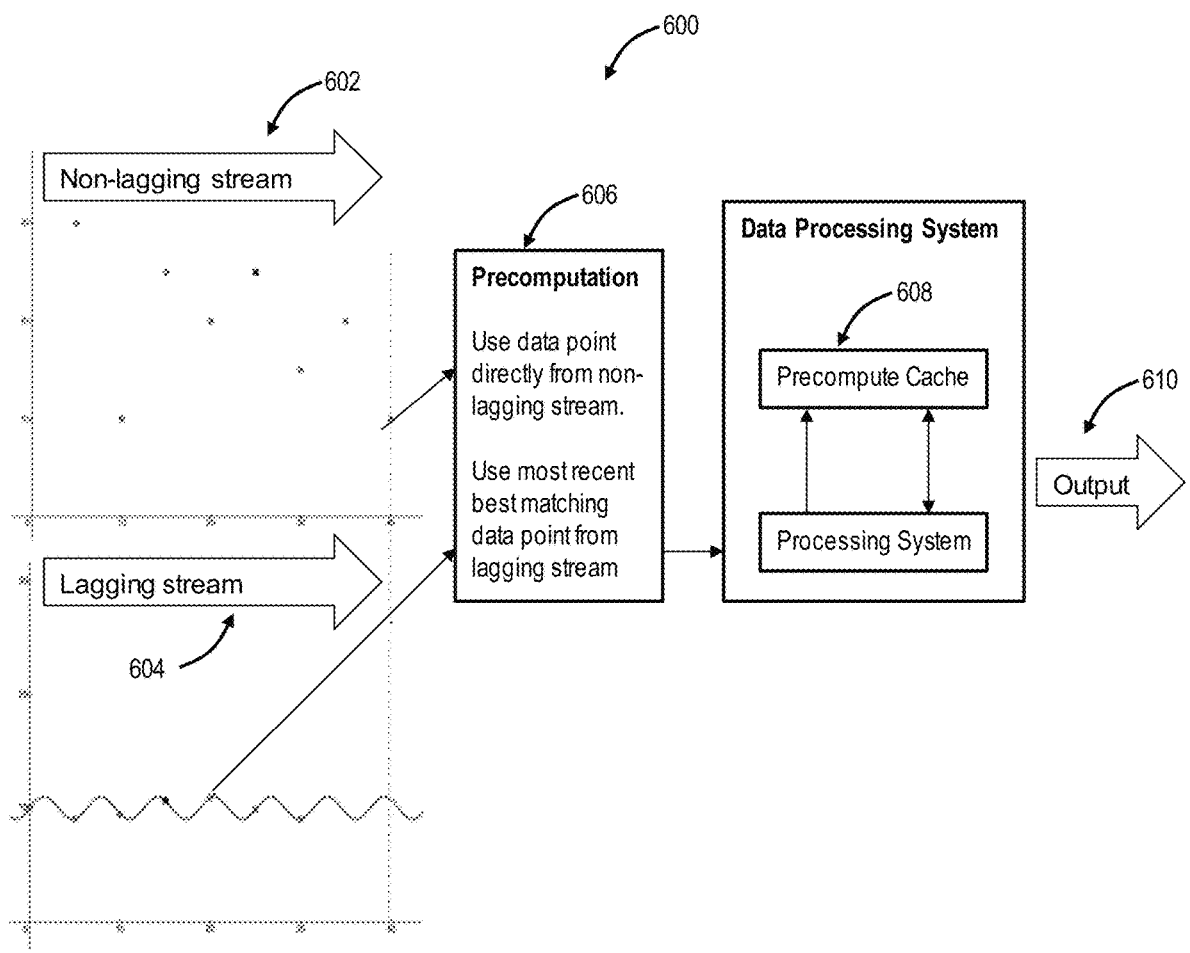
FIG. 6 is a flow diagram of a processing optimization process used on an exemplary network monitoring system.

FIG. 6 is a flow diagram of a processing optimization process 600 used on an exemplary network monitoring system. An example where such an optimization can be useful is a network monitoring system, which processes routing state and traffic in an IP/MPLS network to generate traffic reports/stats. Inputs to such systems can include routing states of the network 602, discovered by the system, which can be in real-time and typically not lagging. Additionally, inputs include traffic flow details 604 exported to the system by routers in the network via netflow/sFlow which can experience lagging. Again, input data streams can include the various traffic flows disclosed in foregoing sections herein, while data structures which make up the flows can be contemplated as the traffic matrices similarly disclosed herein. The output 610 of the system can be a set of paths taken by traffic flows in the network, mapped with the traffic flows. The path for each traffic flow can be computed by simulating the hop-by-hop routing behavior of IP/MPLS networks using the network state.

The flow stream can be lagging because there can be overheads in aggregating packets into flows at the routers, and communication overheads due to the UDP channel used. Traffic reports and statistics are produced using the traffic flow paths. Hence the essential output of the system is traffic flows paths only, with traffic reports and stats being prepared by performing post processing. In typical service provider networks, the traffic follows a sinusoidal pattern, where same pairs of sources and destinations communicate at the same point of time every day. For example, there are certain pairs which are at the peak of their communication at midnight, such as a user streaming videos every evening from the same content provider, and certain other pairs which are at their peaks at noon. The traffic thus forms a repetitive pattern similar to a sine wave. With this information, the proposed systems and methods can be used to precompute probable paths associated with a time for which routing state has been discovered, but traffic flows have not been received yet. The precomputing can be performed in a precomputation engine 606.

In various embodiments, a time having a pattern in the past most likely to match with the current time is chosen, based on the past data point selection strategies described in the previous sections. The paths are computed using the past time traffic flows and current time routing state, and the precomputations are stored in a cache 608. They are then cached against the past time traffic flows used. Later, when actual traffic flows for the current time are received, they can be compared with the cached traffic flows of past time. If there is a cache hit (a complete or partial match), the path cached with the matching traffic flow is used, thus saving a path computation at that time. This way, the delay time in receiving the traffic flows is utilized to reduce the computation time when the actual data arrives. This is done in parallel with processing the traffic flows actually available at the time (not lagging).

Figure 7:
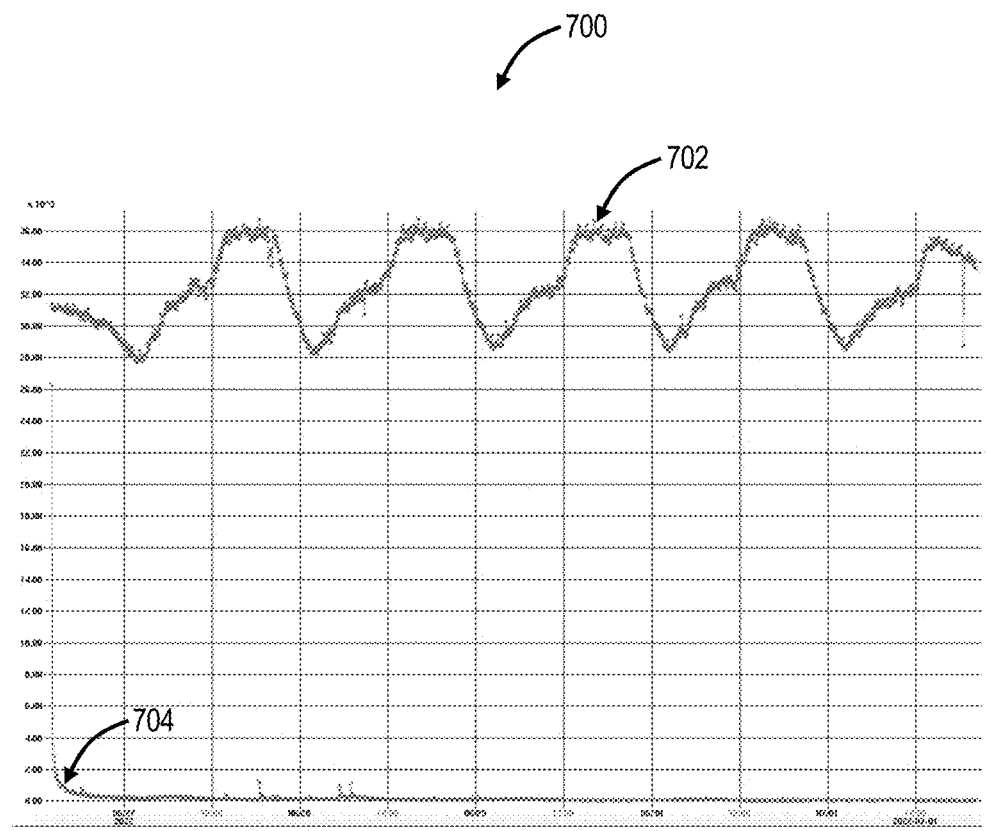
FIG. 7 is a graph which depicts repetition in traffic flows in service provider networks.

FIG. 7 is a graph 700 which depicts repetition in traffic flows in service provider networks. It has been plotted using data streams received on a live service provider network. In the graph shown in FIG. 7, the data streams are as follows. The non-lagging stream is the routing state of the service provider network discovered by Rout Optimization and Analysis (ROA) systems. For the duration of the data capture, the routing state of the network stays constant (i.e., there were no changes in the network). Hence, the stream has a constant value over all the data points. The lagging stream is the one or more traffic flows in the network, exported to ROA. The output of processing is a set of paths used by traffic flows, computed using both the streams fora time together. The paths (i.e., output values) are stored in a set of unique values, and the number of new additions to the set are monitored over time. The graph 700 plots the variation in the traffic flows 702 (lagging stream) and the new anomalous flows 704 for which new paths had to be computed (mainly flow additions). Note that, in the data captured in FIG. 7, the precomputation is not yet used. But since the routing state (non-lagging stream) is constant for all times, the observation gives a correlation between variations in traffic flows (lagging stream) and variations in output. It validates the optimization precomputation can provide when there are variations in routing state. As seen in the graph 700, after an initial spike, very few new paths had to be computed for the output paths set. As routing state is constant, only variation that can result in addition of new paths can be in traffic flows. The routing state may change and does not need to be constant. However, it is well known that 90% of routing changes only impact 10% of prefixes on the Internet, and it is also known that these 10% prefixes do not have much associated traffic. The graph 700 also verifies that there is very little variation in traffic flows, i.e., the majority of the traffic flows received are the same as those received in previous cycles.

The present invention takes advantage of the repeating pattern in lagged input streams. It predicts the lagged input based on past data and precomputes their contribution to the output function. Once the lagged input stream catches up, the output function precomputations (predictions) are reevaluated. The impact of false predictions are filtered out and the contributions of any missed predictions are added. The system acts on the final output function thus achieved. Hence, the final output function contains no predictions. It is identical to the output an unpredicted implementation would generate if it computes when the data from lagging stream arrives. The use of precomputation (and leveraging predictions) increases the processing capacity of systems by several orders of magnitude leading to smaller footprint of deployment and higher efficiency.

In various embodiments, there are two identifiable phases of processing. The first phase includes precomputation of an output function using predicted values of lagged input streams, when the lagged input streams have not arrived. The second phase includes re-evaluation and correction of the precomputed/predicted output function when lagged input streams arrive. In the second phase, the output function is computed by incorporating the continuous aspects of the actual data in the lagged input stream or streams. In various examples, the discrete computation determines the paths (routers and links), ASs, services, etc. for each flow. This information is precomputed using past flow data. The continuous part assigns actual share of flows bandwidth to the above discovered elements. This information is not predicted in the invention and is generated when actual data on lagging flow streams are available. The reason for this is that slight deviations in flow bandwidth are very likely, even with all other factors remaining the same. As a result, the system would not get as much gain in processing capacity if the share of flow bandwidth is also predicted, since it would increase the re-computations in the second phase. However, other applications of the invention may benefit by predicting the continuous aspects in the first phase.

It will be appreciated that the present systems and methods can be used in any system which produces an output based on a plurality of inputs, where some or all of the inputs are lagged. Such systems include the network systems disclosed herein, and others of the like. The embodiments based on the examples disclosed herein shall be contemplated as non-limiting, as the present steps can be utilized to optimize any system which exhibits the previously disclosed characteristics.

Figure 8:
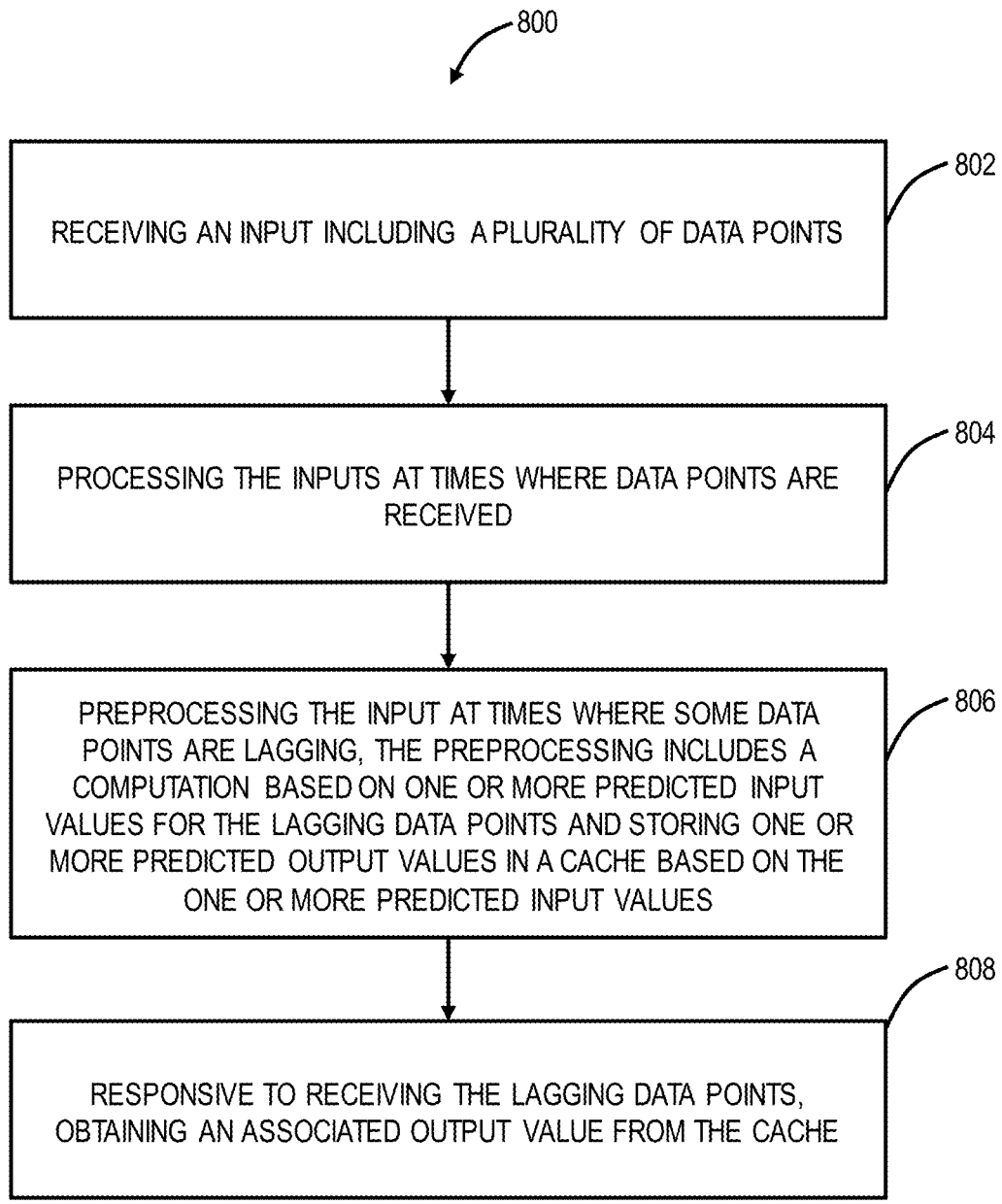
FIG. 8 is a flowchart of a process to optimize data stream processing.

FIG. 8 is a flowchart of a process 800 to optimize data stream processing. The process 800 contemplates implementation as a method, via circuitry or a processing device, and via instructions embodied in a computer-readable medium. The process 800 can be implemented by a network element, Network Management System (NMS), as off-box software, or the like. The process 800 includes steps of receiving an input including a plurality of data points (step 802). Processing the inputs at times where data points are received (step 804). Preprocessing the input at times where some data points are lagging, the preprocessing includes a computation based on one or more predicted input values for the lagging data points and storing one or more predicted output values in a cache based on the one or more predicted input values (step 806). Responsive to receiving the lagging data points, obtaining an associated output value from the cache (step 808).

The process 800 can further include steps wherein the obtaining includes finding a predicted input value that is close to a corresponding received data point. Responsive to any of the received lagging data points not being close to the predicted input values, processing the any of the received lagging data points to obtain actual output values. Responsive to a predicted input value being a partial match to a received lagging data point, processing a portion of the received lagging data point that is not a match to the predicted input value. The preprocessing of lagging data points is done in parallel with the processing of received data points. The one or more predicted input values are chosen based on a pattern. Responsive to all lagging data points being received, the steps further include reevaluating the predicted output values, wherein a final output function contains no predicted output values.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium comprising instructions that, when executed by a processing device of a data stream processing system having multiple parallel processing units and a cache, cause the processing device to perform steps of:
receiving, via a network interface, an input including a plurality of data points from a plurality of data streams, the plurality of data streams including at least one non-lagging stream and at least one lagging stream having a known temporal or value predictable pattern;
processing, in a first parallel processing unit, the input at times where data points from all of the plurality of data streams are received;
preprocessing, in a second parallel processing unit during idle cycles caused by the at least one lagging stream, the input at times where some data points are lagging, the preprocessing including computing, based on one or more predicted input values for the lagging data points determined from the known temporal or value predictable pattern, one or more computation predicted outlet values, and storing the one or more predicted output values in the cache indexed to corresponding predicted input values; and
responsive to receiving the lagging data points, comparing the lagging data points with the corresponding predicted input values to determine a cache hit, and, upon a cache hit, obtaining an associated output value from the cache for use in generating a final output function, wherein the final output function contains no predicted output values.

2. The non-transitory computer-readable medium of claim 1, wherein the obtaining includes finding a predicted input value that is a match or partial match to a corresponding received data point.

3. The non-transitory computer-readable medium of claim 1, wherein the steps further include:
responsive to any of the received lagging data points not being a match or partial match to the predicted input values, processing the any of the received lagging data points to obtain actual output values.

4. The non-transitory computer-readable medium of claim 1, wherein the steps further include:
responsive to a predicted input value being a partial match to a received lagging data point, processing a portion of the received lagging data point that is not a match to the predicted input value.

5. The non-transitory computer-readable medium of claim 1, wherein the preprocessing of lagging data points is done in parallel with the processing of received data points.

6. The non-transitory computer-readable medium of claim 1, wherein the one or more predicted input values are chosen based on a known predictable temporal or value pattern of the lagging stream.

7. The non-transitory computer-readable medium of claim 1, wherein responsive to all lagging data points being received, the steps further include:
reevaluating the predicted output values.

8. A method comprising steps of:
receiving, via a network interface communicatively coupled to a processing device of a data stream processing system having multiple parallel processing units and a cache, an input including a plurality of data points from a plurality of data streams, the plurality of data streams including at least one non-lagging stream and at least one lagging stream having a known temporal or value predictable pattern;
processing, in a first parallel processing unit, the input at times where data points from all of the plurality of data streams are received;
preprocessing, in a second parallel processing unit during idle cycles caused by the at least one lagging stream, the input at times where some data points are lagging, the preprocessing including computing, based on one or more predicted input values for the lagging data points determined from the known temporal or value predictable pattern, one or more computation predicted output values, and storing the one or more predicted output values in cache indexed to correspond predicted input values; and
responsive to receiving the lagging data points, comparing the lagging data points with the corresponding predicted input values to determine a cache hit, and, upon a cache hit, obtaining an associated output value from the cache for use in generating a final output function, wherein the final output function contains no predicted output values.

9. The method of claim 8, wherein the obtaining includes finding a predicted input value that is a match partial match to a corresponding received data point.

10. The method of claim 8, wherein the steps further include:
responsive to any of the received lagging data points not being a match or partial match to the predicted input values, processing the any of the received lagging data points to obtain actual output values.

11. The method of claim 8, wherein the steps further include:
responsive to a predicted input value being a partial match to a received lagging data point, processing a portion of the received lagging data point that is not a match to the predicted input value.

12. The method of claim 8, wherein the preprocessing of lagging data points is done in parallel with the processing of received data points.

13. The method of claim 8, wherein the one or more predicted input values are chosen based on a known predictable temporal or value pattern of the lagging stream.

14. The method of claim 8, wherein responsive to all lagging data points being received, the steps further include:
reevaluating the predicted output values.

15. A system comprising:
a plurality of processors forming multiple processing units, a cache, a network interface, and memory storing instructions that, when executed, cause the plurality of processors to:

receive, via the network interface, an input including a plurality of data points from a plurality of data streams, the plurality of data streams including at least one non-lagging stream and at least one lagging stream having a known temporal or value predictable pattern;

process, in a first parallel processing unit, the input at times where data points from all of the plurality of data streams are received;

preprocess, in a second parallel processing unit during idle cycles caused by the at least one lagging stream, the input at times where some data points are lagging, the preprocessing including computing, based on one or more predicted input values for the lagging data points determined from the known temporal or value predictable pattern, one or more computation predicted output values, and storing the one or more predicted output values in cache indexed to corresponding predicted input values; and responsive to receiving the lagging data points, compare the lagging data points with the corresponding predicted input values to determine a cache hit, and, upon a cache hit, obtain an associated output value from the cache for use in generating a final output function, wherein the final output function contains no predicted output values.

16. The system of claim 15, wherein the obtaining includes finding a predicted input value that is a match or partial match to a corresponding received data point.

17. The system of claim 15, wherein the steps further include:

responsive to any of the received lagging data points not being a match or partial match to the predicted input values, processing the any of the received lagging data points to obtain actual output values.

18. The system of claim 15, wherein the steps further include:

responsive to a predicted input value being a partial match to a received lagging data point, processing a portion of the received lagging data point that is not a match to the predicted input value.

19. The system of claim 15, wherein the preprocessing of lagging data points is done in parallel with the processing of received data points.

20. The system of claim 15, wherein the one or more predicted input values are chosen based on a known predictable temporal of value pattern of the lagging stream.

* * * * *